United States Patent [19]

Crivello

[11] Patent Number: 4,705,887

[45] Date of Patent: Nov. 10, 1987

[54] AROMATIC POLYVINYL ETHERS AND HEAT CURABLE MOLDING COMPOSITIONS OBTAINED THEREFROM

[75] Inventor: James V. Crivello, Clifton Park, N.Y.

[73] Assignee: General Electric Company, Schenectady, N.Y.

[21] Appl. No.: 718,595

[22] Filed: Apr. 1, 1985

Related U.S. Application Data

[62] Division of Ser. No. 459,442, Jan. 20, 1983, Pat. No. 4,518,788.

[51] Int. Cl.$^4$ .................. C07C 69/34; C07C 69/52
[52] U.S. Cl. ..................................... 560/190; 560/76; 560/89; 560/179; 560/189; 560/198; 568/39; 568/608; 568/616; 568/625; 568/636; 568/638; 556/434; 556/449
[58] Field of Search .............. 560/190, 76, 179, 189, 560/89, 198; 568/39, 608, 616, 625, 636, 638; 556/434, 449

[56] References Cited

U.S. PATENT DOCUMENTS 4,394,433 7/1983 Gatzke ........................ 430/151

OTHER PUBLICATIONS

Kato, M. et al., Journal of Polymer Science, vol. 13, 1901–1910 (1975).

Primary Examiner—Paul J. Killos
Attorney, Agent, or Firm—William A. Teoli; James C. Davis, Jr.; James Magee, Jr.

[57] ABSTRACT

Aromatic polyvinylethers and active hydrogen compound reaction products thereof have been found to provide fast heat curable molding compositions when used with various heat activated curing catalysts, for example, diaryliodonium salts in combination with aromatic polyvinylether soluble copper compounds, or dialkylhydroxyarylsulfonium salts in combination with certain organic oxidants.

2 Claims, No Drawings

AROMATIC POLYVINYL ETHERS AND HEAT CURABLE MOLDING COMPOSITIONS OBTAINED THEREFROM

This application is a division of application Ser. No. 459,442, filed 1/20/83, now U.S. Pat. No. 4,518,788.

CROSS REFERENCE TO RELATED APPLICATIONS

Reference is made to copending application of James V. Crivello and David A. Conlon for Condensation Method for Making Aromatic Polyvinylethers, copending application Ser. No. 638,992, filed Dec. 9, 1975, for Polymerizable Compositions, which is a continuation application of Ser. No. 466,377, filed May 2, 1974, now abandoned. Reference also is made to copending application Ser. No. 188,083, filed Sept. 17, 1980, which is a division of Ser. No. 638,992, filed on or about Oct. 8, 1980, for Heat Curable Compositions, where all of the aforementioned applications are assigned to the same assignee as the present invention.

BACKGROUND OF THE INVENTION

Prior to the present invention, various epoxy resins and vinyl organic compounds were readily photopolymerized to different cured decorative or protective coatings, as shown by Noguchi et al, U.S. Pat. No. 3,933,509 and my U.S. Pat. Nos. 4,058,400, 4,058,401, 4,069,055 and 4,069,056 assigned to the same assignee as the present invention.

In my U.S. Pat. No. 4,173,511, a wide variety of heat curable cationically polymerizable organic materials are shown which can be converted to the cured tack-free state in the absence of radiant energy by the use of a cationic curing catalyst in the form of a diaryliodonium salt and a copper salt. Other heat curable compositions also are shown in U.S. Pat. No. 4,230,814 assigned to the same assignee as the present invention, wherein there is described the use of a certain hydroxyaryldialkylsulfonium salts and organic peroxide to effect the cure of various cationically polymerizable organic materials.

Although valuable cured coatings and a wide variety of shaped high performance reinforced structures can be made by the above-mentioned procedures utilizing different forms of energy with diverse cationically polymerizable organic materials and an appropriate cationic curing catalyst, those skilled in the art know that in many instances, optimum heat curable molding compositions are often not available. An optimum heat curable molding composition, for example, would cure to a product at a temperature in the range of 100° C. to 180° C. exhibiting a heat distortion temperature of about 90° C. in about 60 to 180 seconds.

It has been found that alkyl vinyl mono ethers do not provide optimum heat curable molding compositions because such materials often cure to tacky materials. In addition, polyalkylvinylethers, for example diethylene glycol divinylether, are often so reactive, when heated in the presence of a heat activated cationic curing catalyst that the resulting cured material is often charred. Improved results have been achieved with epoxy resins, but in many instances these materials often require a cure of several minutes, particularly in instances where aryl-substitution is utilized, such as the diglycidyl ether of bisphenol-A to improve the heat distortion of the resulting cured product. Efforts to reduce the molecular weight of such materials to improve the cure speed often increase the risk of toxicity of the resulting epoxy resin due to its greatest volatility.

The present invention is based on the discovery that certain aromatic polyvinylethers, for example, 2,2-bis(p-vinyloxyethoxyphenyl)propane, and reaction products of such materials with various active hydrogen compounds, for example, polycarboxylic acids, phenols, silanes, thiols, etc., can be utilized with a variety of heat activated cationic curing catalysts, to produce optimum molding compositions. Depending upon the nature of the aromatic polyvinylether, or reaction product thereof, a wide variety of heat curable compositions are provided which can be used for various molding applications.

STATEMENT OF THE INVENTION

There is provided by the present invention, heat curable compositions comprising, (A) aromatic polyvinylethers selected from
  (i) polyvinyl compounds having the formula, $$R[GR^1OC(R^2)=C(R^3)_2]_n, \text{ and} \tag{1}$$

(ii) reaction products comprising said polyvinyl compound and from 0.1 to 1 mole, per mole of said polyvinyl compound of an active hydrogen compound selected from polycarboxylic acids, phenols, thiols, silanes and polyols, and (B) an effective amount of a thermal curing catalyst comprising (a) an arylonium salt selected from a diaryliodonium salt and a dialkyl hydroxyarylsulfonium salt and (b) from 0.1 part to 10 parts, per part of said arylonium salt of an organic oxidant or an aromatic polyvinylether soluble copper compound, which thermal curing catalyst is capable of generating an acid having a pK value of less than 14, when the heat curable composition is heated to a temperature of at least 90° C., where G is selected from the class consisting of —O—,

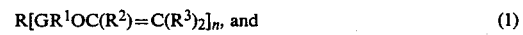

and mixtures thereof, R is a polyvalent aromatic organic radical, $R^1$ is a $C_{(1-8)}$ alkylene radical, $R^2$ and $R^3$ are the same or different monovalent radicals selected from hydrogen, halogen and $C_{(1-8)}$ alkyl radicals, and n is an integer equal to 2–10 inclusive.

Radicals included within R of formula (1) are, for example, phenylene, tolylene, xylylene, naphthalane, xenyl, anthrylene,

where Z is selected from —O—, —S—,

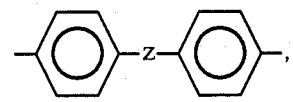

and —$C_yH_{2y}$—,

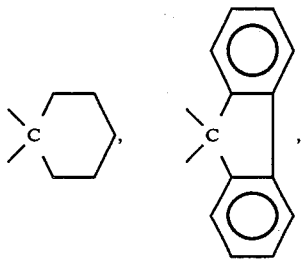

y is equal to 0 to 5 inclusive, and n is as previously defined, and polyvalent aromatic radicals, for example,

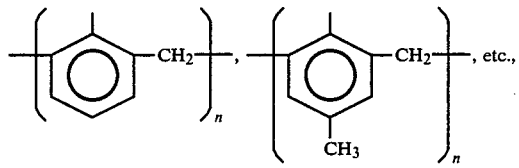

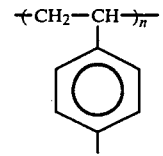

halogenated derivatives thereof are also included, for example, chlorophenylene, bromotolylene, etc. In particular instances, the R radicals can be further substituted with $C_{(1-4)}$ alkyl radicals, and mixtures of halogen and alkyl radicals, etc.

Radicals which are included within the definition of $R^1$ are $C_{(1-8)}$ alkylene radicals, for example, methylene, ethylene, trimethylene, tetramethylene, etc. Radicals included within the definition of $R^2$ and $R^3$ are, for example, methylene, ethylene, trimethylene, tetramethylene, etc. Radicals included within the definition of $R^2$ and $R^3$ are, for example, hydrogen, $C_{(1-8)}$ monovalent alkyl radicals, such as methyl, ethyl, propyl, etc., and halogen radicals, for example, chloro, bromo, etc.

There are included within the aromatic polyvinyl ethers of formula (1), compounds such as,

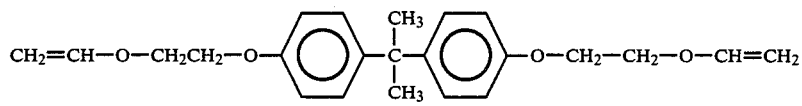

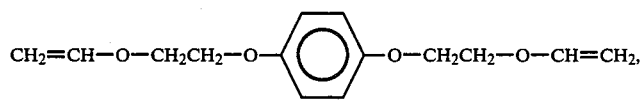

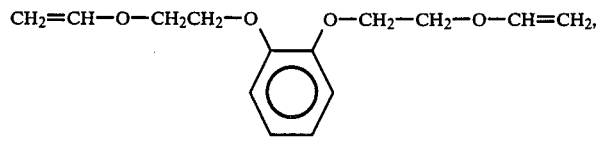

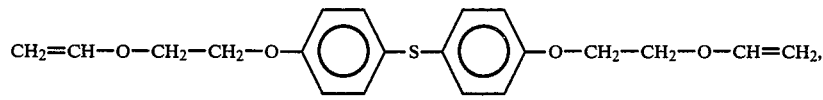

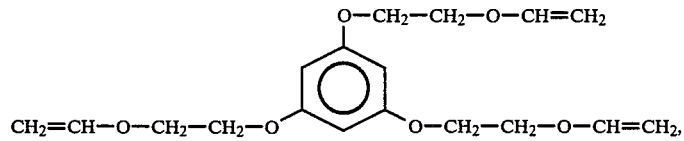

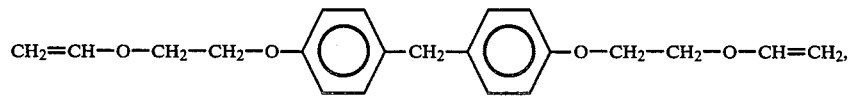

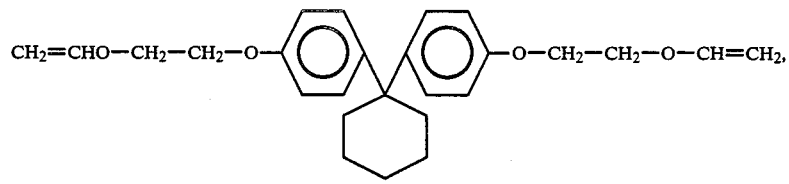

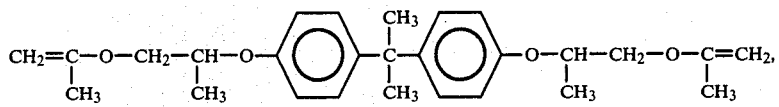

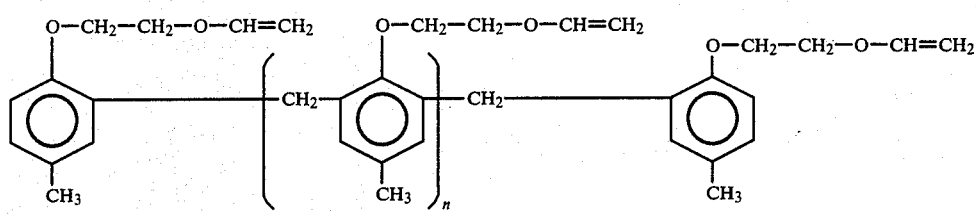

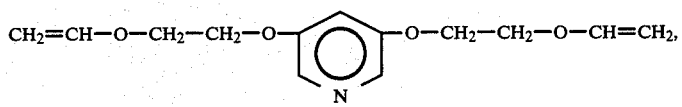

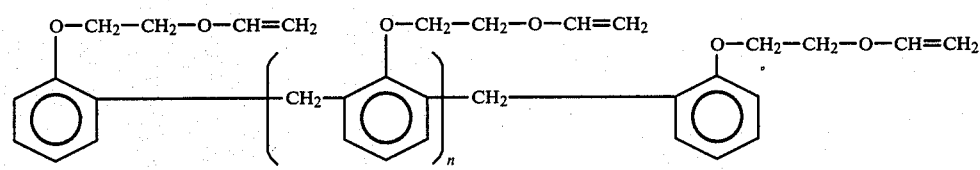

Reaction products of the above aromatic polyvinylether and an active hydrogen compound can be made by heating a uniform mixture of the aromatic polyvinylether and active hydrogen compound in the aforementioned proportions. Temperatures can vary, depending upon the nature of the ingredients and the proportions utilized. A typical temperature, for example, can be 25° C. to 200° C.

Some of the active hydrogen compounds which can be reacted with the above aromatic polyvinylethers are aliphatic polycarboxylic acids such as:

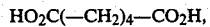

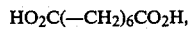

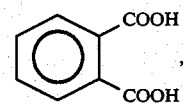

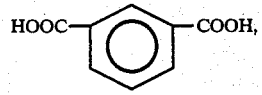

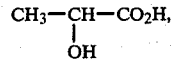

aryl polyols, such as:

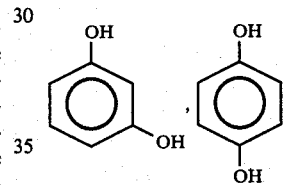

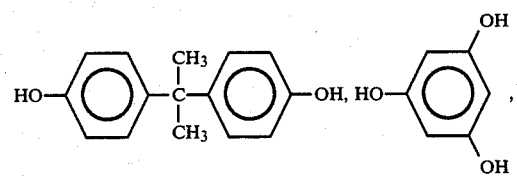

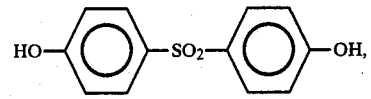

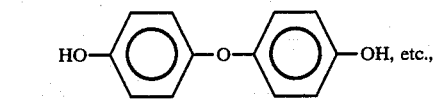

alkanols, such as;

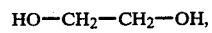

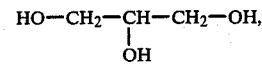

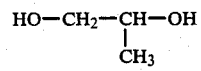

-continued

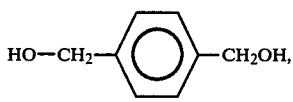

HO—(CH$_2$)$_{10}$—OH, sucrose, glucose, cellulose, starch, etc.; thiols, such as:

HS—(CH$_2$)$_6$—SH

H$_2$S,

HS—CH$_2$—CH$_2$—CO$_2$H, etc., silanes, such as;

One method of making some of the aromatic polyvinylethers of formula (1) is in accordance with copending application RD-12516 of James V. Crivello and David A. Conlon, by condensing an alkali metal-aryl hydroxide or acid salt with a haloalkylvinylether in the presence of a dimethylsulfoxide, as shown by the following equation:

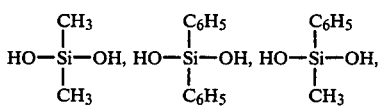

where R, R$^1$, R$^2$ and R$^3$ and n are as previously defined, X is a halogen radical and M is an alkali metal ion.

Some of the aryl hydroxides which can be used to make the above shown alkali metal arylhydroxide salts employed in making the aromatic polyvinylethers are as follows:
2,2-bis(4-hydroxyphenyl)propane (bisphenol-A);
2,4'-dihydroxydiphenylmethane;
bis-(2-hydroxyphenyl)methane;
1,1-bis(4-hydroxyphenyl)ethane;
1,1-bis-(4-hydroxyphenyl)propane;
3,3-bis-(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenylsulfone;
2,4'-dihydroxydiphenylsulfone;
4,4'-dihydroxydiphenylsulfoxide;
4,4'-dihydroxydiphenylsulfide;
hydroquinone;
catechol;
resorcinol;
2,2-bis(3,5-dibromo-4-hydroxyphenyl)propane;
3,3-bis(4-hydroxyphenyl)fluorene;
3,4'-dihydroxydiphenylmethane;
4,4'-dihydroxybenzophenone;
4,4'-dihydroxydiphenylether;
1,1-dichloro-2,2-bis(4-hydroxyphenyl)ethylene;
1,1,1-trichloro-2,2-bis(4-hydroxyphenyl)ethane;
4-hydroxybenzoic acid, etc.

Included within the aryl carboxylic acids which can be used to make the alkali metal-aryl carboxylic salts used in the synthesis of the aromatic polyvinylether of formula (1) are, for example,

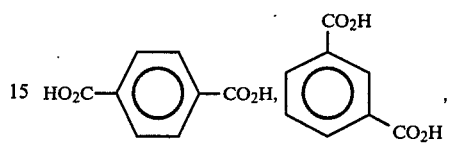

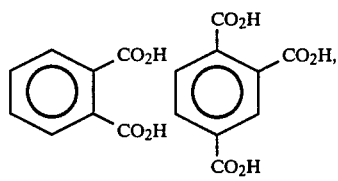

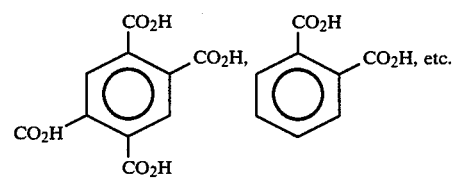

As previously indicated, the heat curable molding compositions of the present invention can be made by blending an effective amount of the thermal curing catalyst with the polyarylvinylether. An effective amount of the thermal curing catalyst includes 0.1% to 10% by weight of the arylonium salt, based on the weight of heat curable molding composition; the amount of organic oxidant or copper compound used in combination with the arylonium salt is as previously defined. Depending upon the particular ingredients used in the heat curable mixture, melt blending can be used in certain instances, particularly where the aromatic polyvinylether has a melting point of 25° C. to 100° C. Otherwise, solvent blending can be used. Useful solvents are, for example propylene carbonate, γ-butyrolacetone, ethylene carbonate, triphenylphosphate, anisole, nitrobenzene, o-dichlorobenzene, methylethyl ketone, etc.

The aryl onium salts which can be used in the practice of the invention to make the thermal curing catalyst include aryl sulfonium salts, as shown in my U.S. Pat. Nos. 4,058,400, 4,161,478, 4,230,814, etc., and aryliodonium salts, as shown in my U.S. Pat. Nos. 4,173,551, 4,216,288, etc., assigned to the same assignee as the present invention. Some of the typical arylsulfonium salts are, for example,

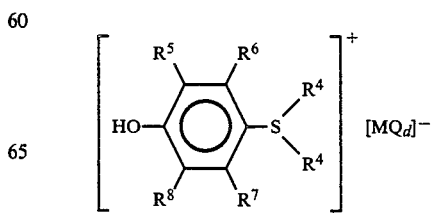

where $R^4$ is a $C_{(1-8)}$ alkyl radical, $R^5$-$R^8$ are monovalent radicals selected from hydrogen, $C_{(1-8)}$ alkyl, $C_{(1-8)}$ alkoxy, nitro, chloro, etc., M is a metal or metalloid, Q is a halogen radical and d is an integer equal to 4-6, for example,

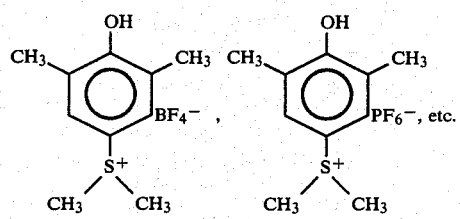

Among the aryliodonium salts which can be used in the practice of the present invention are, for example,

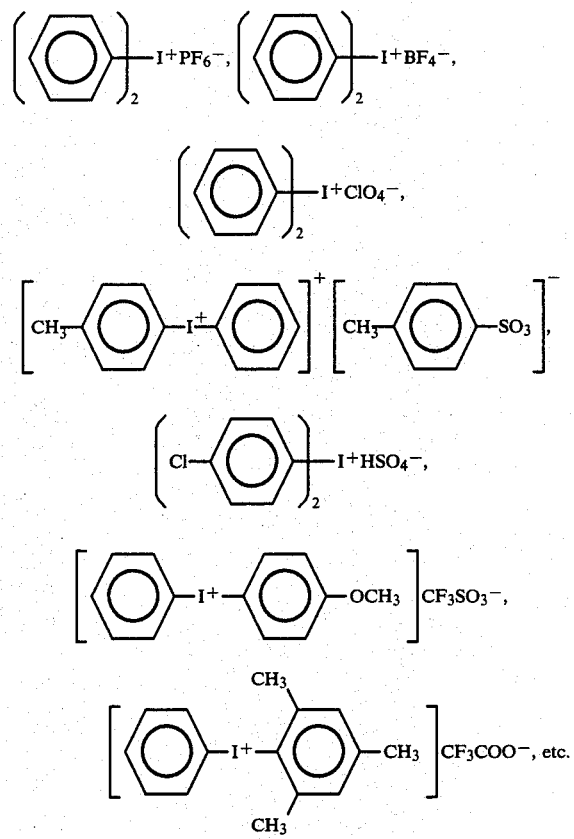

Some of the anions of the arylonium salts used in the practice of the invention can be

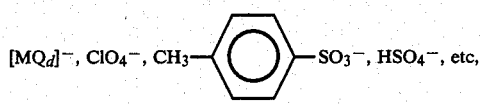

where M, Q and d are as previously defined.

The organic oxidants which can be used in the practice of the invention with the aryl sulfonium salts are, for example, organic peroxides such as ketone peroxides, peroxy acids, dibasic acid peroxides, aldehyde peroxides, alkyl peroxides, hydroperoxides, alkyl peroxyesters, diperoxide derivatives, for example, t-butyl peroxypivalate, 2,4-dichlorobenzoyl peroxide, caprylyl peroxide, lauroyl peroxide, decanoyl peroxide, propionyl peroxide, acetyl peroxide, t-butyl peroxyisobutyrate, p-chlorobenzoyl peroxide, benzoyl peroxide, hydroxylheptyl peroxide, cyclohexanone peroxides, 2,5-dimethylhexyl-2,5-di(peroxybenzoate), di-t-butyl diperphthalate, t-butylhydroperoxide, di-t-butyl peroxide, methyl ethyl ketone peroxide, p-methane hydroperoxide, cumene hydroperoxide, 2,5-dimethylhexyl-2,5-dihydroperoxide, t-butyl hydroperoxide, peracetic acid, perbenzoic acid, m-chloroperbenzoic acid, etc.

In addition to organic peroxides, organic oxidants which also can be used in the practice of the invention include azo-bis-alkyl nitriles and other azo compounds, such as

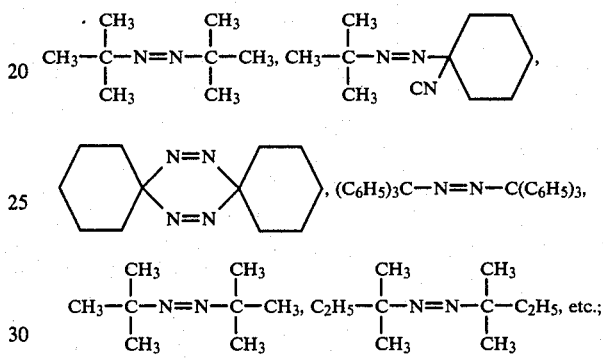

quinones, such as

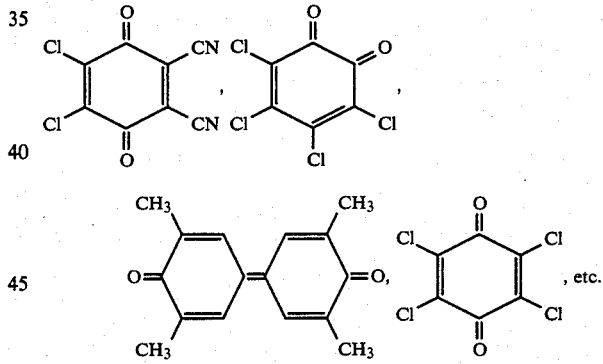

Arylvinyl ether soluble copper compounds as utilized in the definition of the terms of the present invention include copper salts, copper chelates and other copper compounds which dissolve sufficiently in the arylvinylether to produce a solution having at least 0.01% by weight of the copper compound. Some of the copper compounds which can be used with the driaryliodonium salts are, for example, copper chelates are shown in Cotton and Wilkinson, Advanced Inorganic Chemistry 3rd Edition, Interscience, Publishers, New York 1972, pages 905 to 922. Copper chelates which are preferred, are those compounds which can be readily incorporated or dispersed in the cationically polymerizable material, as defined hereinafter, for example, an epoxide resin, or by an in situ reaction, or in a carrier solvent. Additional references is made to the definition of chelate in Kirk-Othmer, Encyclopedia of Chemical Technology, 3rd Edition, Vol. 5, pp. 339-367 (1979) John Wiley and Sons, New York.

Some of the copper chelates which are included within the scope of the present invention are, for example, copper acetyl acetonate, copper salicylate, CuI(C6H5)3P, CuI(C2H5O)3P, CuCl2C2H8N2, etc.

Additional copper compounds are copper salts, for example, copper naphthenate, copper benzoate, copper citrate, copper stearate, copper oleate, copper gluconate, copper (I) bromide, copper (II) bromide, copper (I) chloride, copper (II) chloride, copper (I) trifluoroacetate, etc.

The heat curable molding compositions of the present invention can contain inactive ingredients such as silica, talc, clay, glass fibers, extenders, hydrated alumina, carbon fibers, process aids, etc., in amounts of up to 500 parts of inactive ingredients per 100 parts of aromatic polyvinylether or active hydrogen compound reaction products thereof. The heat curable composition can be applied to such substrates as metal, rubber, plastic, molded parts of films, paper, wood, glass, cloth, concrete, ceramic, etc.

Some of the applications in which the curable compositions of the present invention can be used are, for example, protective, decorative and insulating coatings, potting compounds, printing inks, sealants, adhesives, molding compounds, wire insulating, textile coatings, laminates, impregnated tapes, varnishes, etc.

In order that those skilled in the art will be better able to practice the invention, the following examples are given by way of illustration and not by way of limitation. All parts are by weight.

EXAMPLE 1

A mixture of 456 parts of bisphenol-A, 240 parts of sodium hydroxide and about 1500 parts of dimethylsulfoxide was stirred for about 1 hour under a nitrogen atmosphere. The mixture was then heated from an ambient temperature to 70°–75° C. There was then added dropwise 640 parts of 2-chloroethylvinylether. The mixture was then stirred for 5 hours at 70°–75° C. and then poured into 3,000 parts of water. Air was bubbled into the mixture to effect the removal of the excess 2-chloroethylvinylether. There was obtained a solid material which was recovered by vacuum filtration. The material was recrystallized from methanol. It had a melting point of 57°–58° C. and it was recovered at a 90% yield. Based on method of preparation the product was an aryldivinylether having the formula,

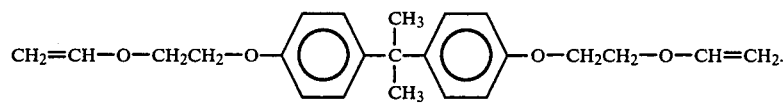

A blend of 40 parts of the above aromatic polyvinylether, 86 parts of 325 mesh silica, manufactured by the Illinois Mineral Company, 0.39 parts of diphenyliodonium hexafluorophosphate and 0.156 part of copper stearate was placed in a molding press having a 4"×4"×⅛" cavity. The mixture was obtained by heating the aromatic polyvinylether to a temperature of about 65° C. and stirring the iodonium salt and the copper stearate into the resulting liquid followed by the incorporation of the reinforcing silica. The blend was molded at a temperature of 120° C. at 13,000 psi.

The above procedure was repeated, except that in place of the aromatic polyvinylether there was used 1,6-hexanediol divinylether and Epon 825, which is the diglycidol ether of bisphenol-A. An additional run was made with the Epon 825 utilizing 1.56 part of the diphenyliodonium hexafluorophosphate and 0.2 part of the copper stearate. The following results were obtained which shows the molding conditions utilized and the nature of the product obtained, where "BPADVE" is the aromatic polyvinylether and where the iodonium salt is diphenyliodonium hexafluorophosphate:

TABLE I

| Resin | Iodonium Salt | Copper Stearate | Molding Conditions | Product |
|---|---|---|---|---|
| BPADVE | 0.39 | 0.156 | 2 min at 120° C. | Cured hard solid plaque |
| Epon 825 | 0.39 | 0.156 | >15 min at 170° C. | No cure, No plaque |
| 1,6-hexanediol divinylether | 0.39 | 0.156 | 2 min at 120° C. | Cured, soft plaque, crumbled when removed from mold |
| Epon 825 | 1.56 | 0.2 | 6 min at 120° C. | Soft flexible plaque |

The above results show that the aromatic polyvinylether used in the practice of the present invention provides molding compositions which are faster curing and which utilize less curing catalyst than the analogous epoxy compound. The aliphatic divinylether, 1,6-hexanediol divinylether, was unsuitable as a molding material. It was also found that the Epon 825 required a total of 45 minutes at 120° C. to obtain a cured, hard, solid plaque similar to the plaque obtained from the aromatic polyvinylether after 2 minutes at 120° C. using about 25% by weight of the diphenyliodonium hexafluorophosphate.

EXAMPLE 2

In accordance with the procedure of Example 1, additional aromatic polyvinylethers were prepared utilizing various bisphenols or hydroxyaryl carboxylic acids and 2-chloroethylvinylether. The following aromatic polyvinylethers were obtained, where melting point is in degrees centigrade:

TABLE II

| Aromatic Polyvinyl Ether | Phenol | M.P. (°C.) |
|---|---|---|
| CH₂=CHOCH₂CH₂O—⟨⟩—S—⟨⟩—OCH₂CH₂OCH=CH₂ | Thiodiphenol | 70–72 |
| CH₂=CHOCH₂CH₂O—⟨⟩—⟨⟩—OCH₂CH₂OCH=CH₂ | p,p'-biphenol | 149–150 |
| CH₂=CHOCH₂CH₂O—⟨⟩—OCH₂CH₂OCH=CH₂ | hydroquinone | 101–102 |
| CH₂=CHOCH₂CH₂O—⟨⟩—OC₂CH₂OCH=CH₂ (meta) | resorcinol | 85–87 |
| ⟨⟩ with two ortho OCH₂CH₂OCH=CH₂ groups | catechol | 46–48 |
| CH₂=CHOCH₂CH₂O—⟨⟩(C(CH₃)₃)—OCH₂CH₂OCH=CH₂ | 2-t-butyl hydroquinone | 80–82 |
| CH₂=CHOCH₂CH₂O—⟨⟩(2,5-di-C(CH₃)₃)—OCH₂CH₂OCH=CH₂ | 2,5-di-t-butyl hydroquinone | 88–90 |
| (CH₃)₃C—⟨⟩ with two OCH₂CH₂OCH=CH₂ groups | 5-t-butyl catechol | liquid |
| ⟨⟩—COCH₂CH₂OCH=CH₂ (with ortho OCH₂CH₂OCH=CH₂) | salicylic acid | 61–63 |

The identities of the above aromatic polyvinylethers were further confirmed by spectral data, such as NMR and elemental analysis. All of these aromatic polyvinylethers can be used to make valuable heat curable molding compositions in accordance with the practice of the method of the present invention.

EXAMPLE 3

A heat curable molding composition was prepared by blending together on a two roll mill at 50°–70° C. the following ingredients with the aromatic polyvinylether of Example 1, which are shown by weight percent utilized in the blend.

| | |
|---|---|
| 390 g Resin | 28.8% |
| 858 g SiO₂ (219) | 63.3% |
| 78 g ¼" Glass | 5.8% |
| 3.9 g PIFP | 0.29% |
| 1.56 g Cu(Stear)₂ | 0.12% |
| 15.6 g TiO₂ | 1.25 |
| 7.8 g Monarch Blue | 0.58% |

A sheet-like molding compound was formed which was pulverized and then transfer molded in a Hull Transfer Molding Press at 110°–120° C. at about 1,000–5,000 psi. Typical molding cycles were 1–2 minutes. the following physical properties were obtained from the resulting fabricated test bars:

| | |
|---|---|
| Spiral Flow | 23 in at 125° C. |
| Min. Cure Cycle | 2 min |
| Gardner Impact | 16 in-lb |
| Notched Izod | 0.9 ft-lb/in |
| HDT | 160° C. (320° F.) |
| Hot Rigidity | 13 mils |
| Tg | 141–142° C. |

EXAMPLE 4

There was added 1 part of a 50% solution of diphenyliodonium hexafluorophosphate in propylenecarbonate and 0.1 part of copper stearate to 25 parts of the aromatic polyvinylether of Example 1 at 70° C. The mixture was used while still hot to impregnate glass cloth square. The treated glass substrate was allowed to cool resulting in a dry, tack-free prepreg. Several 3"×3" squares were cut from the prepreg to produce a laminate. The laminate was cured after 2 minutes heat at 150° C. at 2,000 psi in a Carver press. The resulting laminate would be useful in a number of applications including circuit boards, structural members of automobiles, aircraft, etc.

EXAMPLE 5

A mixture of the aromatic polyvinylether of Example 1, having 0.1 part of diphenyliodonium hexafluoroarsenate and 0.03 part of copper stearate was melted and poured into a mold. The catalyzed resin was then placed in a forced air oven at 100° C. for 1 hour and then for 2 hours at 150° C. A pale yellow 4"×6"×¼" plaque was obtained which was cut into standard test bars. The heat distortion temperature of the test bar was found to be 168° C.

The same procedure was followed, except that in place of the aromatic polyvinylether of Example 1, there was used the diglycidyl ether of bisphenol-A. In addition, 1.75 parts of diphenyliodonium hexafluoroarsenate and 0.125 part of copper stearate was cured under the same conditions. It was found that the heat distortion temperature of the resulting product was 161° C.

EXAMPLE 6

A mixture of 2.95 parts of the aromatic polyvinylether of Example 1 and 2.64 parts of glutaric acid was heated under a nitrogen atmosphere at 125°–130° C. for 1 hour. There was obtained a viscous pale yellow resin which did not harden at room temperature after an extended period of time.

There was added 0.025 part of copper naphthanate and 0.054 part of various diphenyliodonium salts to 10 parts of the above-described resin. A GE gel timer was then used to determine the gel times of various mixtures at 100° C. where the iodonium salt contained in a particular mixture is shown below.

| Iodonium Salt | Gel Time |
|---|---|
| $[CH_3-C(CH_3)_2-C_6H_4-]_2 I^+ AsF_6^-$ | 2.9 in. |
| $[CH_3-C(CH_3)_2-C_6H_4-]_2 I^+ PF_6^-$ | 5.2 min. |
| $[CH_3-C(CH_3)_2-C_6H_4-]_2 I^+ ClO_4^-$ | 2.9 min. |
| $[CH_3-C(CH_3)_2-C_6H_4-]_2 I^+ CF_3SO_3^-$ | 2.4 min. |

The above procedure was repeated, except the gel times were recorded at 150° C. The results obtained are shown as follows:

| 150° C. | Gel Time |
|---|---|
| $[CH_3-C(CH_3)_2-C_6H_4-]_2 I^+ AsF_6^-$ | 1.0 min. |
| $[CH_3-C(CH_3)_2-C_6H_4-]_2 I^+ PF_6^-$ | 1.2 min. |
| $[CH_3-C(CH_3)_2-C_6H_4-]_2 I^+ ClO_4^-$ | 1.4 min. |
| $[CH_3-C(CH_3)_2-C_6H_4-]_2 I^+ CF_3SO_3^-$ | 1.4 min. |

All of the above cured products were hard, yellow and soluble materials useful as insulating coatings or encapsulants.

EXAMPLE 7

A molten mixture of 100 parts of a divinylether of the formula,

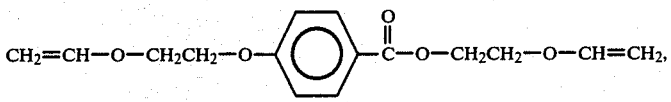

0.001 part of copper stearate and 0.25 part of diphenyliodonium hexafluorophosphate at a temperature of 70° C. was poured into a 4"×6"×¼" mold. The mold was then placed into a forced air oven for 1 hour at 100° C. and then heated at 175° C. for 0.5 hour. An orange colored slab was obtained having a heat distortion temperature of 90° C. This showed that the original curable mixture was useful as an encapsulant for electronic components.

EXAMPLE 8

A mixture of 400 parts of the aromatic polyvinylether of Example 7, 1600 parts of 325 mesh silica, manufactured by the Illinois Mineral Company, 6.11 parts of diphenyliodonium hexafluorophosphate, 1.56 parts of copper stearate, 7.2 parts of carnuba wax, 15.6 parts of titanium oxide and 7.5 parts of phthalocyanine green were milled together on a 2 roll mill at 50°–70° C. The resulting molding compound was then pressed into 60 parts preforms which were transfer molded into bars at 110° C. There was obtained tough molded bars which indicated that the original curable composition could be used to make shaped molded parts useful in a variety of applications, for example, automobile parts, tool handles, etc.

EXAMPLE 9

In accordance with the procedure of Example 1, a bisphenol-A-formaldehyde novolak was etherified with 2-chloroethylvinylether and sodium hydroxide. Based on method of preparation, there was obtained the corresponding novolak-vinyl ether resin.

There was added to 10 parts of the above novolak-vinyl ether resin, 22 parts of silica filler, 0.094 part of diphenyliodonium hexafluorophosphate and 0.037 part of copper stearate. The above mixture was thoroughly ground in a mortar and pestal until a homogeneous mixture was obtained. The mixture was then placed in the cavity of a molding press. A hard solid plaque was obtained within 2 minutes at 120° C.

EXAMPLE 10

A uniform blend of 40 parts of the aromatic polyvinylether of Example 1, 0.78 part of benzoylperoxide, 86 parts of silica filler and 0.39 part of a dialkylhydroxyarylsulfonium salt of the formula,

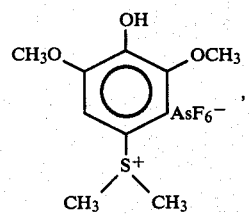

was placed in a mold cavity in accordance with the method of Example 9. A hard cured sheet was obtained after 2 minutes at 120° C.

EXAMPLE 11

A uniform blend of 20 parts of the aromatic polyvinylether of Example 1, 20 parts of bisphenol-A diglycidylether, 86 parts of silica, 1.56 part of diphenyliodonium hexafluorophosphate and 0.2 part of copper stearate was placed in a mold cavity. A hard dark slab was obtained when the blend was pressed at 120° C. for 1.5 minutes.

EXAMPLE 12

A uniform blend of 40 parts of the aromatic polyvinylether of Example 1, 0.39 part of diphenyliodonium hexafluorophosphate, 86 parts of silica and 0.78 part of benzoylperoxide was placed in a mold cavity. There was obtained a light colored hard cured slab when the blend was molded at 120° C. for 2 minutes.

Although the above examples are directed to only a few of the very many variables which can be utilized in the practice of the present invention, it should be understood that the present invention is also directed to a much broader variety of curable aromatic polyvinylether compositions which can be curable at ambient temperatures as shown, for example, by use of catalyst systems shown in Crivello U.S. Pat. Nos. 4,225,691 and 4,241,204, assigned to the same assignee as the present invention. In these low temperature curable aromatic polyvinylether compositions there is utilized a diaryliodonium salt in combination with a reducing agent, such as ascorbic acid, or dialkylhydroxysulfonium salts utilized in combination with certain organic oxidants, such as iodoso aromatic esters, or the use of certain amines or transition metals in combination with organic peroxides. Among the preferred aromatic polyvinylethers are compounds included within the formula, $$R^9[GR^1OC(R^2)=C(R^3)_2]_n, \text{ and}$$

where $R^1$, $R^2$ and $R^3$ are as previously defined, and $R^9$ includes all of the aforementioned radicals as shown by R, except $$-C_yH_{2y}-.$$

What I claim as new and desire to secure by Letters Patent of the United States is:

1. An aromatic polyvinylether in the form of a reaction product of
(A) polyvinyl compound having the formula, $$R[GR^1OC(R^2)=C(R^3)_2]_n,$$

where G is selected from the class consisting of
—O—,

and mixtures thereof, R is a polyvalent aromatic orgmanic radical, $R^1$ is a $C_{(1-8)}$ alkylene radical, $R^2$ and $R^3$ are the same or different monovalent radicals selected from hydrogen, halogen and $C_{(1-8)}$ alkyl radicals, and n is an integer equal to 2–10 inclusive, and (B) from 0.1 to 1 mole, per mole of said polyvinyl compound of an active hydrogen compound selected from the class consisting of (a) carboxylic acids selected from the class consisting of, $HO_2C(-CH_2)_4-CO_2H;$ $HO_2C(-CH_2)_6CO_2H,$ $HO_2C(-CH_2)_8-CO_2H,$

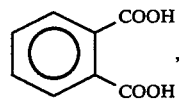

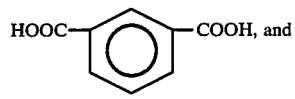

$CH_3-CH-CO_2H,$
$\qquad\;\;|$
$\qquad\;\;OH$ (b) aryl polyols, selected from the class consisting of,

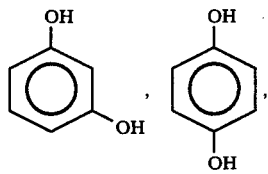

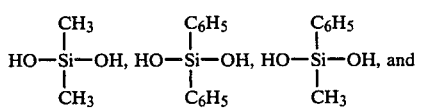

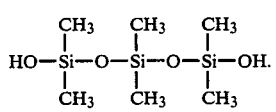

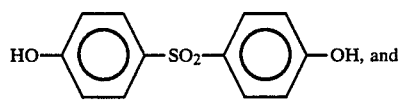

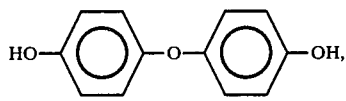

(c) alkanols, selected from the class consisting of, $HO-CH_2-CH_2-OH,$ $HO-CH_2-CH-CH_2-OH,$
$\qquad\qquad\;\;|$
$\qquad\qquad\;\;OH$ $HO-CH_2-CH-OH$
$\qquad\qquad\;|$
$\qquad\qquad\;CH_3$ $HO-(CH_2)_4-OH,$

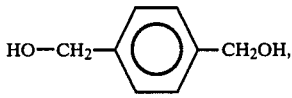

$HO-(CH_2)_{10}-10,$ sucrose, glucose, cellulose, (d) thiols, selected from the class consisting of, $HS-(CH_2)_6-SH,$

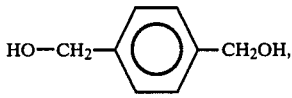

$H_2S,$ $HS-CH_2-CH_2-CO_2H,$ and (e) silanes, selected from the class consisting of, $$\begin{array}{ccc} CH_3 & C_6H_5 & C_6H_5 \\ | & | & | \\ HO-Si-OH, & HO-Si-OH, & HO-Si-OH, \text{ and} \\ | & | & | \\ CH_3 & C_6H_5 & CH_3 \end{array}$$

$$\begin{array}{ccc} CH_3 & CH_3 & CH_3 \\ | & | & | \\ HO-Si-O-Si-O-Si-OH. \\ | & | & | \\ CH_3 & CH_3 & CH_3 \end{array}$$

2. A polyvinyl aromatic ether in accordance with claim 1 in the form of a reaction product of glutaric acid and 2,2-bis-(4-vinyloxyethoxypheyl)propane.

* * * * *